United States Patent [19]

Warner et al.

[11] 4,078,443
[45] Mar. 14, 1978

[54] POWER TRANSMISSION BELT

[75] Inventors: John Craig Warner, Ithaca, N.Y.; Mark William Gravel, Keokuk, Iowa

[73] Assignee: Borg-Warner Corporation, Chicago, Ill.

[21] Appl. No.: 747,163

[22] Filed: Dec. 3, 1976

[51] Int. Cl.² .................. F16G 1/00; B29D 17/00
[52] U.S. Cl. ....................... 74/231 R; 74/231 P; 156/137
[58] Field of Search ............. 74/231 R, 231 P; 156/137

[56] References Cited

U.S. PATENT DOCUMENTS

| 3,682,012 | 8/1972 | Blankenship | 74/231 R |
| 3,973,670 | 8/1976 | Spaar | 74/231 R X |

Primary Examiner—Leonard H. Gerin
Attorney, Agent, or Firm—Aubrey L. Burgess

[57] ABSTRACT

An endless power transmission belt having a reinforcing and tension member, such as a cord or cloth strip, to which are attached, stiffener and about which is an elastomeric material. The stiffeners for providing lateral stiffness may be finger-like, at least in parts, and adhesively attached to the reinforcing and tension member or molded therearound. The stiffening means may be individual, side-by-side parts or a continuous member.

16 Claims, 16 Drawing Figures

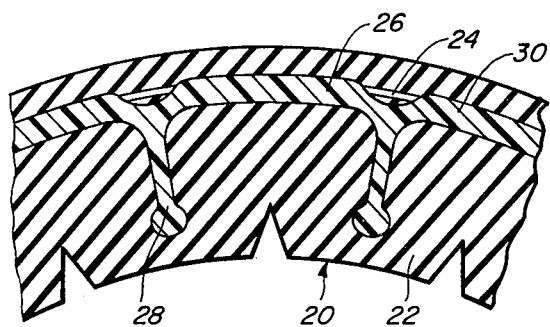
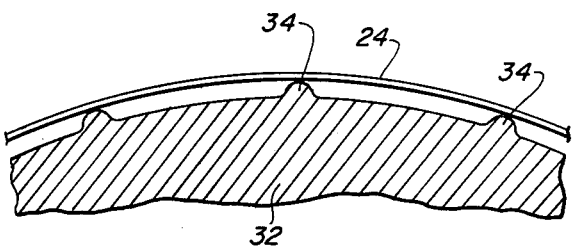
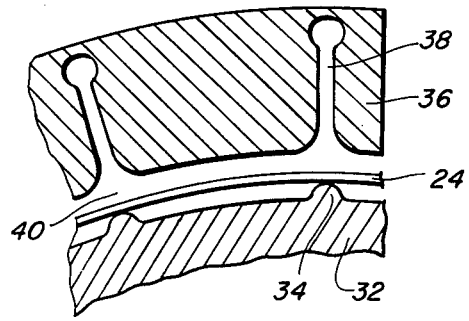
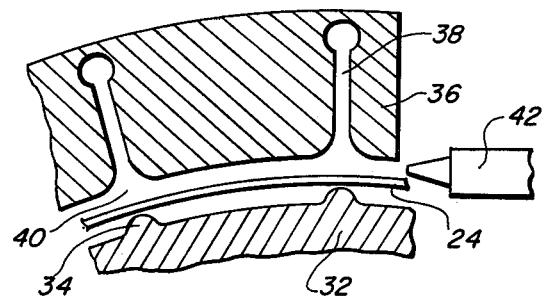
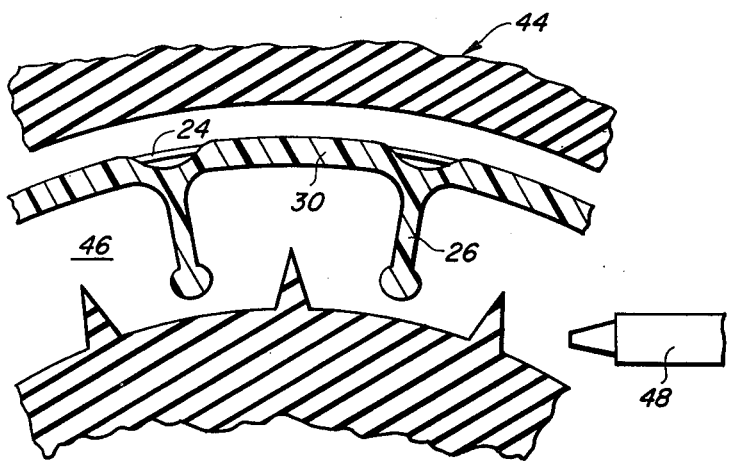

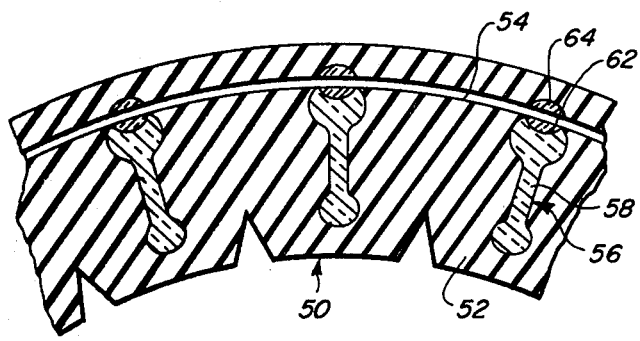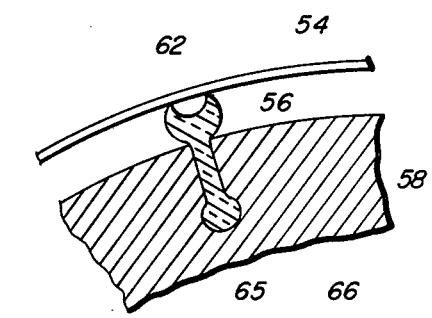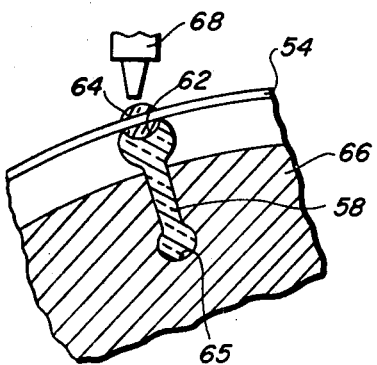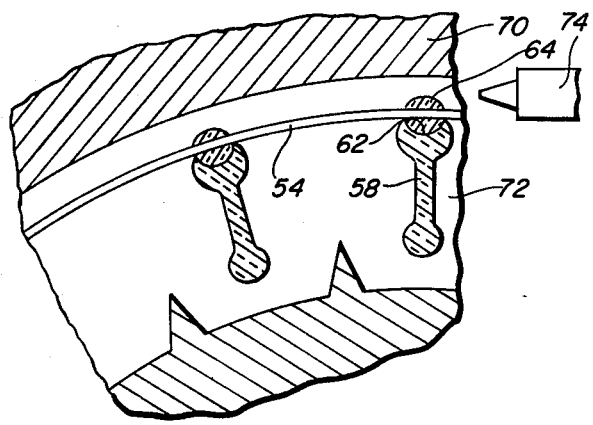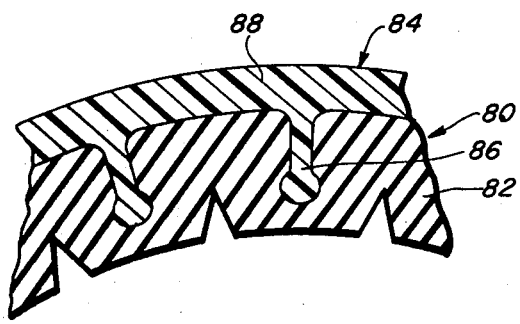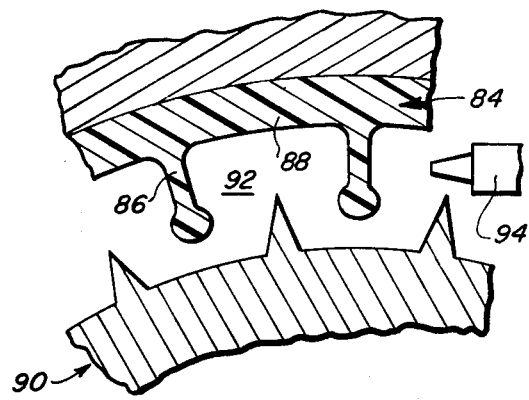

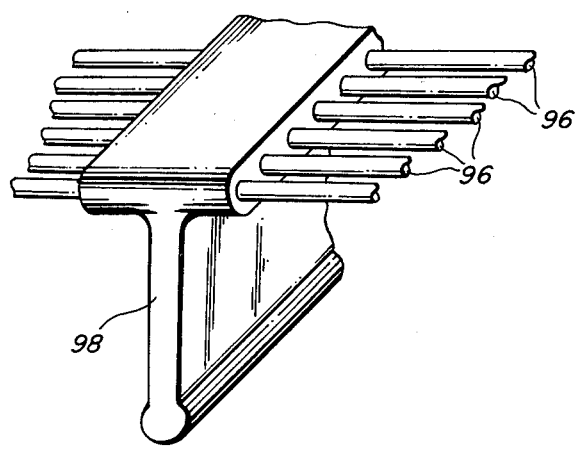
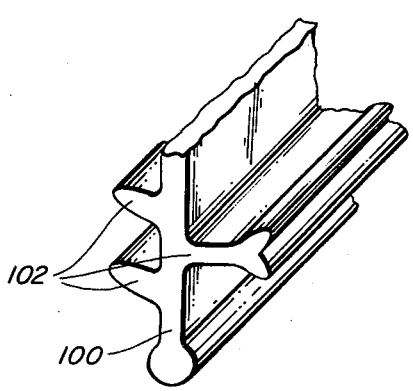
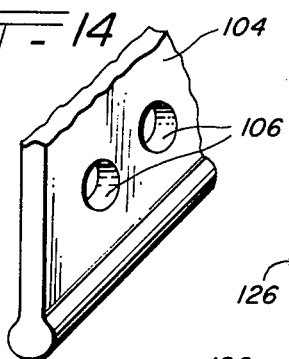
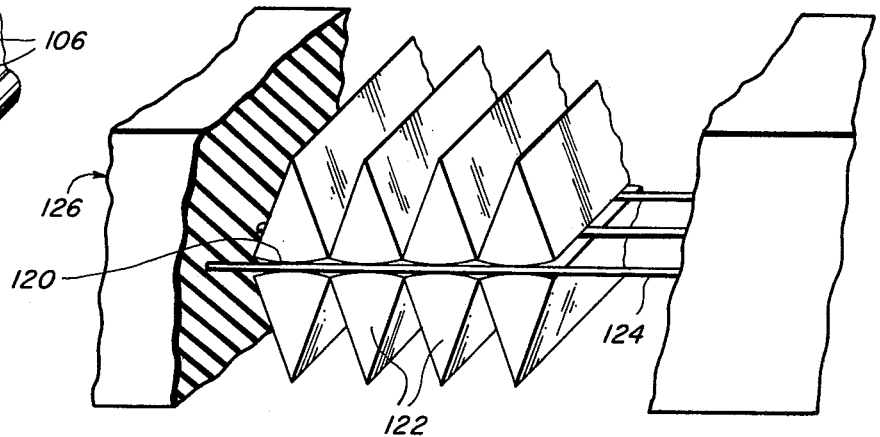
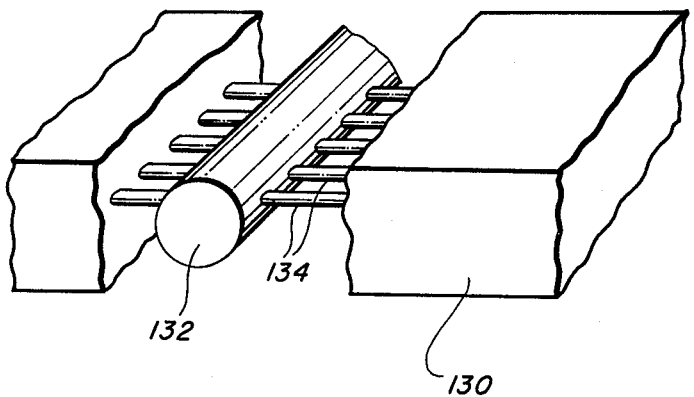

1

POWER TRANSMISSION BELT

BACKGROUND OF THE INVENTION

Power transmission belts comprising an elastomeric body are well known in the art reinforced with one or more helical winds of a cord. Such tension member is usually a fiber glass strand treated to adhere to the elastomer. Some belts also include lateral members to provide a lateral stiffness to the belt while permitting longitudinal flexibility thereof when used especially in variable pulley drives in which the belt performs it power transmission function by engaging the pulley flanges with its edges. In the absence of the stiffeners, belts sag, become arched and distorted. This is undesirable and is to be avoided. Examples of belts with lateral stiffening means are described in U.S. patents to Ungar and Redmond, U.S. Pat. Nos., 2,189,049 and 3,772,929, respectively.

THE INVENTION

The power transmission belt of this invention comprises an elastomeric body in which there is a tension member in the form of a reinforcing cord and a stiffening means. The cord may be a glass strand especially treated to bond to elastomeric material, such as rubber, synthetic rubber or other known material, which strand may be referred to in the trade as "tire cord" because it, or a similar product is used in the manufacture of tires for automotive or other vehicle use. The cord is attached to the stiffener means.

The stiffener means may be individual finger-like members adhesively attached to the cord or a continuous, unitary member having finger-like projections, molded into an integral sub-assembly with the cord. The elastomeric material is generally molded to encompass most of or all of the sub-assembly.

THE DRAWINGS

FIG. 1 is an illustration of a first embodiment of a belt in accordance with this invention;

FIGS. 2, 3, 4 and 5 are illustrations showing steps for producing the belt of FIG. 1;

FIG. 6 is an illustration of a second embodiment of a belt according to this invention;

FIGS. 7, 8 and 9, are illustrations showing steps for producing the belt of FIG. 6;

FIG. 10 is an illustration of a third embodiment of this invention;

FIG. 11 is an illustration showing a step for producing the belt of FIG. 10;

FIGS. 12, 13 and 14 are illustrations showing other features of this invention; and FIGS. 15 and 16 are illustrations of still other embodiments of this invention.

DETAILED DESCRIPTION

The first embodiment of this invention is illustrated in FIG. 1 to which attention is now invited. There is shown a power transmission belt 20; a composite structure of elastomeric material 22, such as rubber, synthetic rubber or other suitable material, a tension-reinforcing member 24, such as a cord generally in a helical wind which may be of fiber glass strand especially treated to adhere to the elastomeric material 22, and stiffening means 26, for example, a suitable plastic or the like, which will adhere to the elastomeric material 22. The stiffening means 26 comprises a plurality of projecting finger-like elements 28 and a band portion 30, which at least partially encircles the tension member 24.

Parts of the belt either the top surface or the bottom surface may be covered with a cloth (not shown) as is conventional. Generally nylon cloth is used for such covering.

Power transmission belts have surfaces which are cogged, ribbed, flat or a combination of these or other configurations, and may be rectangular or V-shaped in cross-section, as desired. For a variable pulley drive, the V-section belt is desirable.

FIGS. 2 to 5 illustrate steps in the method of manufacturing the belt 20 of FIG. 1. In FIG. 2, the tension member 24, such as fiber glass strand, is wound from a reel or the like (not shown) in a helical wind onto a core 32 and over a plurality or radially projecting spacers or lugs 34. The core may be of a width equal to the width of a belt or to the width of multiple belts. The core 32 is used in the next step in which it becomes the inner part of a mold when inserted in an outer mold part 36. The part 36 has a plurality of radially disposed cavities 38 therein which, with the mold parts, defines a mold cavity 40. The next step is injecting a plastic material into the mold cavity 40 to form a composite sub-assembly of tension member (cord) and stiffeners 26, the plastic being injected from an injection molding machine 42, shown schematically in the drawings. The composite sub-assembly produced in FIG. 4 is turned inside out to orient the direction of the stiffeners 26 and then placed into a mold 44 having a cavity 46 and the elastomeric material is introduced, as by an injection molding machine 48, into the cavity 46, around the sub-assembly to form the belt 20.

The entire molding operations may be automated, as in a turrett-type machine. Also, multiple widths of the belt may be produced at one time, after which the product is sliced to desired width and section.

The second embodiment of this invention is illustrated in FIG. 6 to which attention is now invited. There is shown a power transmission belt 50; a composite structure of elastomeric material 52, such as rubber, synthetic rubber, or other suitable material, tension member-reinforcing means 54, such as a cord which may be of glass fiber strand especially treated to adhere to the elastomeric material, 52, and stiffening means 56. The stiffening means 56 differs from that in the FIG. 1 embodiment in that it comprises a plurality of individual finger-like members 58 each having an enlarged end 60 which is preferably provided with a cavity 62. The members 58 are adhesively bonded to the reinforcing means 54 by an adhesive 64, such as an epoxy and the like. The adhesive fills the cavity 62, to insure the bond between 54 and 56.

FIGS. 7 and 8 and 9 illustrate steps for producing the belt 50. In FIG. 7, the stiffening means are inserted in openings 64 in a core 66 and the tension member 54 is wound in a helical wind around the core 66 and in engagement with the stiffeners. As shown in FIG. 8, the wound stiffeners are rotated on the core 66 in a step-by-step operation where an adhesive, such as epoxy and the like is discharged from a dispensing means 68. The composite structure on the core is placed in a mold 70, see FIG. 9, providing a cavity 72 into which the elastomeric material is injected from an injection molding apparatus 74.

The third embodiment of this invention is illustrated in FIG. 10 which shows a belt 80 comprising an elastomeric body 82 having embedded therein a stiffening means 84 which includes prong like members 86 integrally formed with a web 88, the web forming a top exterior surface of the belt 80. The means 84 can be an extruded material such as nylon or the like. In this embodiment, the means 84 is inserted in a mold 90 (see FIG. 11) to provide a cavity 92 into which the elastomeric material is injected from an injection molding machine 94.

FIGS. 12, 13 and 14 show different aspects of the invention. For example, the process for manufacturing the belt of FIG. 6 may be modified by molding the stiffeners on to the cord—see FIG. 12, which shows cord 96 and stiffeners 98. The composite is placed in a mold and elastomeric material is molded therearound.

FIGS. 13 and 14 show means to improve adhesion of the stiffeners to the elastomeric material. In FIG. 13, a stiffener 100 has various shaped projecting splints 102. In FIG. 14, a stiffener 104, is provided with spaced holes 106 for receiving elastomeric material.

FIGS. 15 and 16 illustrate other embodiments of the invention, for example, FIG. 15 shows a belt 120 of an elastomeric material having generally triangular stiffener members 122 connected to the tension cord 124 and extending upwardly and downwardly of the belt. The members 122 abut one another and may have curved surfaces 126 to permit bending of the belt on the pulleys. The belt of FIG. 16, identified as 130 has generally cylindrical stiffener members 132 molded therearound the members 132 abutting one another and in the elastomeric material.

In addition to the processes for manufacturing the belts of this invention as described herein, an automated production line can be envisioned in which the stiffener—cord subassembly is transferred automatically from its mold to the cavity of a belt mold into which the elastomeric material is introduced after which the product is removed. In the event that a multiple belt width is formed, the product is conveyed to appropriate saws which not only slice the formed product into increments but also form the edges as desired.

We claim:

1. A method of making a continuous power transmission belt comprising the steps of:
    forming belt stiffening means having finger-like projecting portions;
    inserting the stiffening means into a mold to define a cavity therewith;
    injecting an elastomeric material into said cavity to bond to said stiffening means and to form the body of said belt.

2. A method of making a belt as in claim 1, further comprising associating a tension member to said stiffener means and thereafter inserting the stiffener means and the tension member into said cavity and injecting the elastomeric material into said mold cavity.

3. A method as recited in claim 2 in which said tension member is a cord, the futher step of winding said cord in a helical wind around said stiffening means.

4. A method as recited in claim 3, the step of adhesively bonding said cord to said stiffening means.

5. A method as recited in claim 3, the step of molding said stiffening means around said cord.

6. A method as recited in claim 2, further comprising forming said stiffening means so that said finger-like projections radiate outwardly and turning said formed stiffening means so that the finger-like projections radiate inwardly prior to inserting said stiffening means in said mold.

7. A power transmission belt comprising an elastomeric body and stiffening means in said body, said stiffening means having a lateral extent closely matching that of said belt and providing a lateral stiffness in excess of that provided by said elastomeric body while permitting longitudinal flexing thereof, said stiffening means comprising spaced finger-like portions extending in the direction of belt thickness.

8. A power transmission belt as recited in claim 7, further including a reinforcing cord associated with said stiffening means and extending longitudinally in said belt.

9. A power transmission belt as recited in claim 8 in which said stiffening means comprises a continuous longitudinal portion and connected projecting portions.

10. A power transmission belt as recited in claim 8 in which said stiffening means are formed with portions around said cord.

11. A power transmission belt as recited in claim 8 in which said stiffening means are adhesively bonded to said cord.

12. A power transmission belt as recited in claim 8 in which said stiffening means comprises a plurality of individual members.

13. A power transmission belt as recited in claim 12 in which said members are formed with portions around said cord.

14. A power transmission belt as recited in claim 12 in which said members are adhesively bonded to said cord.

15. A power transmission belt as recited in claim 7 further including holes in said stiffening means through which said elastomeric body extends to enhance the bond of the elastomeric body thereto.

16. A power tranmission belt as recited in claim 7 further including lugs projecting from said stiffening means to enhance the bond of the elastomeric body thereto.

* * * * *